United States Patent
Jobes, I et al.

[19]

[11] Patent Number: 6,111,498

[45] Date of Patent: Aug. 29, 2000

[54] TRIP COMPUTER READ-OUT ON REARVIEW CAMERA SCREEN

[75] Inventors: Janard J. Jobes, I, Eagle; T. Christopher Atkins, Meridian; Janard J. Jobes, II, Eagle, all of Id.

[73] Assignee: Sawtooth Embedded Systems, Boise, Id.

[21] Appl. No.: 08/987,370

[22] Filed: Dec. 9, 1997

[51] Int. Cl.$^7$ .................................................. B60Q 1/00

[52] U.S. Cl. ....................... 340/438; 340/435; 340/461; 340/903; 340/905; 348/148

[58] Field of Search .................. 340/461, 471, 340/463, 905, 937, 438, 435, 903, 936; 348/148, 149; 701/1, 29

[56] References Cited

U.S. PATENT DOCUMENTS

| | | | |
|---|---|---|---|
| 3,631,388 | 12/1971 | Strong | 340/451 |
| 4,050,295 | 9/1977 | Harvey | 73/114 |
| 4,144,521 | 3/1979 | Lehnhert | 340/450.2 |
| 4,214,266 | 7/1980 | Myers | 358/108 |
| 4,706,063 | 11/1987 | Kelly | 340/449 |
| 4,809,177 | 2/1989 | Windle et al. | 180/170 |
| 4,843,463 | 6/1989 | Michetti | 360/5 |
| 5,289,321 | 2/1994 | Secor | 359/896 |
| 5,508,736 | 4/1996 | Cooper | 348/148 |
| 5,530,421 | 6/1996 | Marshall et al. | 340/436 |
| 5,670,935 | 9/1997 | Schofield et al. | 340/461 |
| 5,680,123 | 10/1997 | Lee | 340/937 |
| 5,764,139 | 6/1998 | Nojima et al. | 340/461 |
| 5,767,794 | 6/1998 | Borsch et al. | 340/937 |
| 5,844,505 | 12/1998 | Van Ryzin | 340/988 |

*Primary Examiner*—Brent A. Swarthout
*Attorney, Agent, or Firm*—Madson & Metcalf

[57] ABSTRACT

Embodiments of a method and readout system are shown and described whereby information regarding a vehicle's diagnostics and trip progress are displayed on the rear-view display or other monitor in the vehicle's cab. Information for display may include the vehicle's mileage, fuel consumption, speed, distances traveled, etc., and the relationship of the data to each other, such as average miles per gallon, average speed, time required for trip and to consume fuel, as well as such diagnostics warnings and information pertaining to oil temperature/pressure, water temperature, transmission temperature, fuel pressure, oil change need in engine or transmission and filter changes. This is accomplished by a microprocessor, which processes external variable data from a keyboard as well as via computerized components of the vehicle itself. The microprocessor generates the data which it has been instructed to generate by the system operator (microprocessor supervisor) and then transmits the data in alphanumeric form to an on-screen display (OSD) circuit, which is in position to be subsequently televised by the video monitor, which is already being used by the vehicle driver for rear-viewing purposes. Thus, the driver has immediate, undistracted access to vital vehicle/trip information as well as rearview images.

8 Claims, 8 Drawing Sheets

TRIP COMPUTER READ-OUT ON REARVIEW CAMERA SCREEN

BACKGROUND OF THE INVENTION

1. Field of the Invention

This invention relates generally to vehicles and more specifically to trip computer read-out displays for vehicles. Disclosed is a method and apparatus for displaying trip computer information on the same monitor screen as for the rearview camera in a vehicle.

2. Related Art

An inherent problem associated with driving vehicles of all descriptions involves the driver's ability to see when seated in a forward-facing position but looking out the back of the vehicle or reversing the motion of the vehicle, i.e., backing, for example, into or out of a parking stall. This problem is intensified when the rear of the vehicle is very large and/or does not have windows through which the driver can see. This problem has been alleviated by devices which include, but are not confined to, video cameras installed in such a manner to record what is behind the vehicle and contemporaneously display its findings on a screen, or monitor, which is installed in a range of vision, for example, on the vehicle's dashboard where the driver of the vehicle can readily see the monitor, yet, simultaneously, said monitor does not obstruct the driver's forward, rear or side views. Additionally, the driver wants to be, or should be, aware of pertinent information regarding 1) the vehicle itself, and 2) the trip at hand upon which the driver and vehicle are embarked.

Traditionally, a report on the vehicle's status and the trip at hand has been available in part by viewing the speed being traveled and distance traveled on a mechanical numeric dial or spin meter, on or in the dash of a vehicle. Diagnostic information regarding the vehicle itself generally has been relegated to vague dials on or in the dash, indicating only general levels of low/average/high on such items as oil pressure, water temperature or fuel level. Worse, many vehicles are equipped simply with a light indicator which turns on only when any of the afore-mentioned items are imminently at a disaster level.

Ideally, then, a driver of a vehicle would like to have immediately-available and visible such important data as, but not necessarily confined to, a continuously-available display of:

a. miles per gallon, average miles per gallon;

b. average speed, miles to destination, time to destination, distance traveled, distance scheduled to travel;

c. fuel consumption by the engine, fuel left in the tank in terms of i) gallons, ii) miles and/or iii) time;

d. diagnostic warnings, such as oil temperature/pressure, water temperature, transmission temperature, fuel pressure;

e. time/miles until next oil change in engine and/or transmission, and time/miles until next oil filter and air filter change in engine.

Obviously, all of this information could not fit on standard dial read-outs on a vehicle dash, due to space constraints. Further, mechanically-provided read-outs would be cumbersome, if not impossible, and/or slow. What is needed is a method of obtaining this information and, simultaneously or subsequently, transmitting this information onto an easily-viewed monitor, or screen, preferably onto a monitor or screen which is already in place for another purpose, thus not requiring additional display space, and not detracting the driver's view to a separate place not directly related to his forward, rearward or side viewing. By this means, a driver of a vehicle can glance at the informational data in the same view area as he is using for rear-viewing, thus distributing his attention between just several areas, forward and side windows, and monitors, rather than additionally looking at a multitude of dials or a separate read-out area. Also, what is needed is a method of obtaining this information and displaying it on an easily-viewed monitor, which method does not require additional dials, gauges or monitors which are space-consuming, expensive and distracting.

Others, in past inventions, have disclosed a means by which rear-viewing can be accomplished in a vehicle via a small video camera and a rearview monitor. U.S. Pat. No. 4,214,266 (Myers, Jun. 19, 1978) directly addresses this issue, but makes no claims for processing any data to be viewed on said screen along with the rearview photography. Similarly, U.S. Pat. No. 5,289,321 (Secor, Feb. 12, 1993) and U.S. Pat. No. 4,843,463 (Michetti, May 23, 1988) both disclose means to video-tape scenes directionally around a vehicle, but also are limited to this photography. U.S. Pat. No. 5,530,421 (Marshall, Apr. 26, 1994) discloses circuitry for automated control of an on-board television system having side- and rearview cameras, so that the operator of the vehicle can choose to manually or automatically operate the system. No disclosures are made in Marshall which involve any video screen inputs or outputs recorded by the camera from a computerized trip information source.

The review of the above-mentioned patents reveals that the rear-view monitors displaying the results of a video camera placed in a vehicle do not address the issue of providing, in addition to rear-view information, pertinent computer-generated trip information and/or vehicle diagnostics. Lacking until now is a convenient and inexpensive means by which to transmit trip information and vehicle diagnostics utilizing a vehicle rear-vision video camera monitor.

SUMMARY OF THE INVENTION

An object of the invention is to make readily-available to a driver of a vehicle all pertinent trip data, vehicle diagnostics and rearward viewing. Further, the desired object is to make this information completely accurate and readily visible on the same display screen, thus enhancing the safety of both vehicle and driver.

The invented system of providing trip and vehicle diagnostic information to the driver on the rearview display monitor involves connecting the components from which vehicle and trip information is extracted, including: engine, transmission, electronic control module, fuel level indicator, real-time clock, speedometer, etc. These components are connected to a microprocessor whose status and functionality are monitored by a microprocessor supervisor and which receives input from the driver via a keypad. The resulting information is transmitted to the rearview video display circuit, consisting mainly of an on-screen display (OSD) processor and support circuitry, and subsequently displayed for the driver on the same monitor as are the rearview pictures.

This invention comprises a means by which information is transmitted from the various functional areas of the vehicle to a microprocessor, to continuously update the driver of the vehicle's status, as desired. Also, variable data regarding individual trips can be keyed into the microprocessor. The desired information is transmitted as a read-out to the rearview video display circuit. The rearview camera monitor, which is already in place for the purpose of aiding the driver in the task of rearviewing, also displays the trip information and vehicle status from the video display circuit which the driver can view at a glance at any time he chooses.

DESCRIPTION OF THE PREFERRED EMBODIMENTS

Referring to FIGS. 1–7, there are shown several, but not the only, possible embodiments of the invented read-out system 10. The invention comprises a wide range of sources from which information is derived to be ultimately displayed on a rearview monitor, including vehicle "vital signs", trip progress and fuel efficiency, and views from cameras mounted outside or inside the vehicle.

Figure 1:
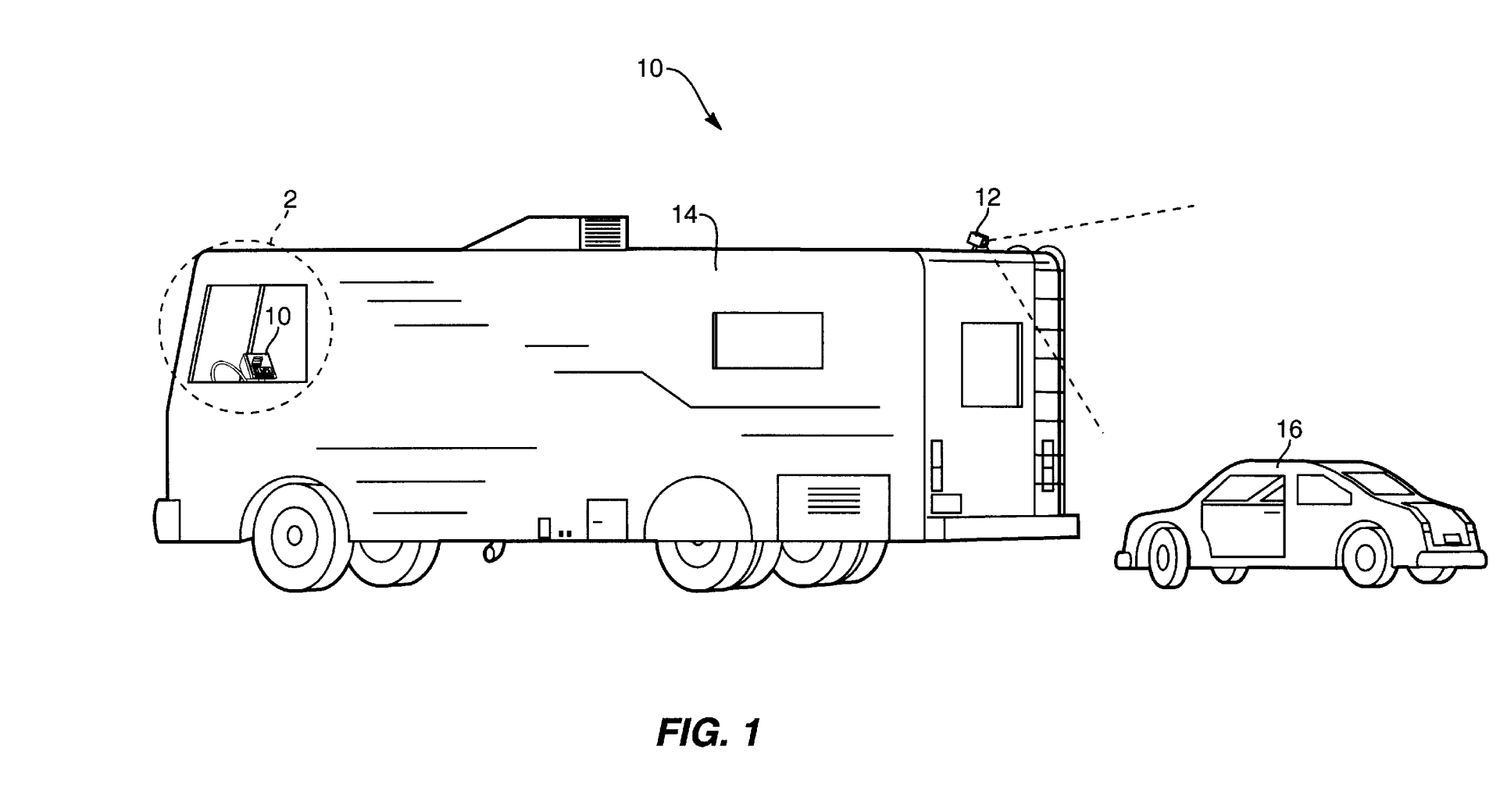
FIG. 1 is a side perspective schematic view of a vehicle with an embodiment of the invention installed in it.
Figure 2:
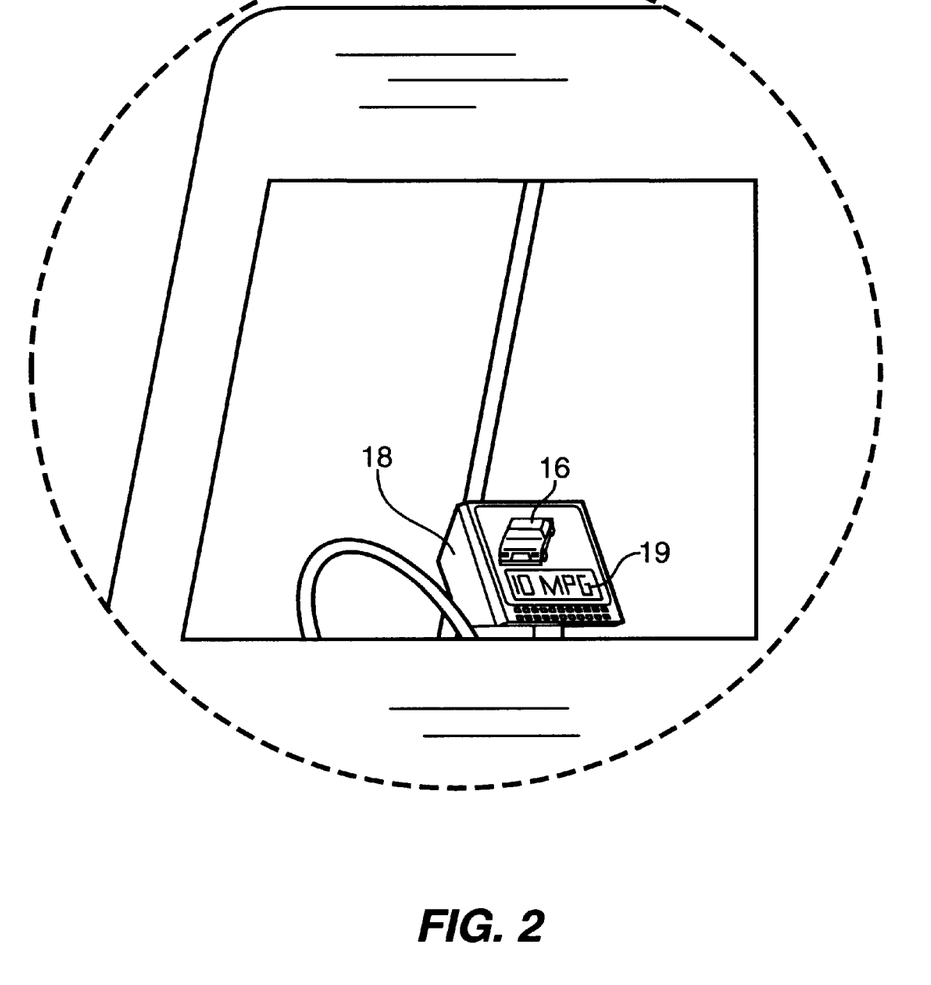
FIG. 2 is a side perspective detail schematic view of the rearview video monitor depicted in FIG. 1 showing a rearview image and trip computer read-out.

For example, in FIG. 1, a rearview camera 12 is mounted on the back of a recreational vehicle 14, capturing the rearview image of automobile 16 which is displayed on rearview monitor 18. In FIG. 2, monitor 18 displays the rearview image 16' of automobile 16 and trip information data 19, in this case "10 MPG".

Figure 3:
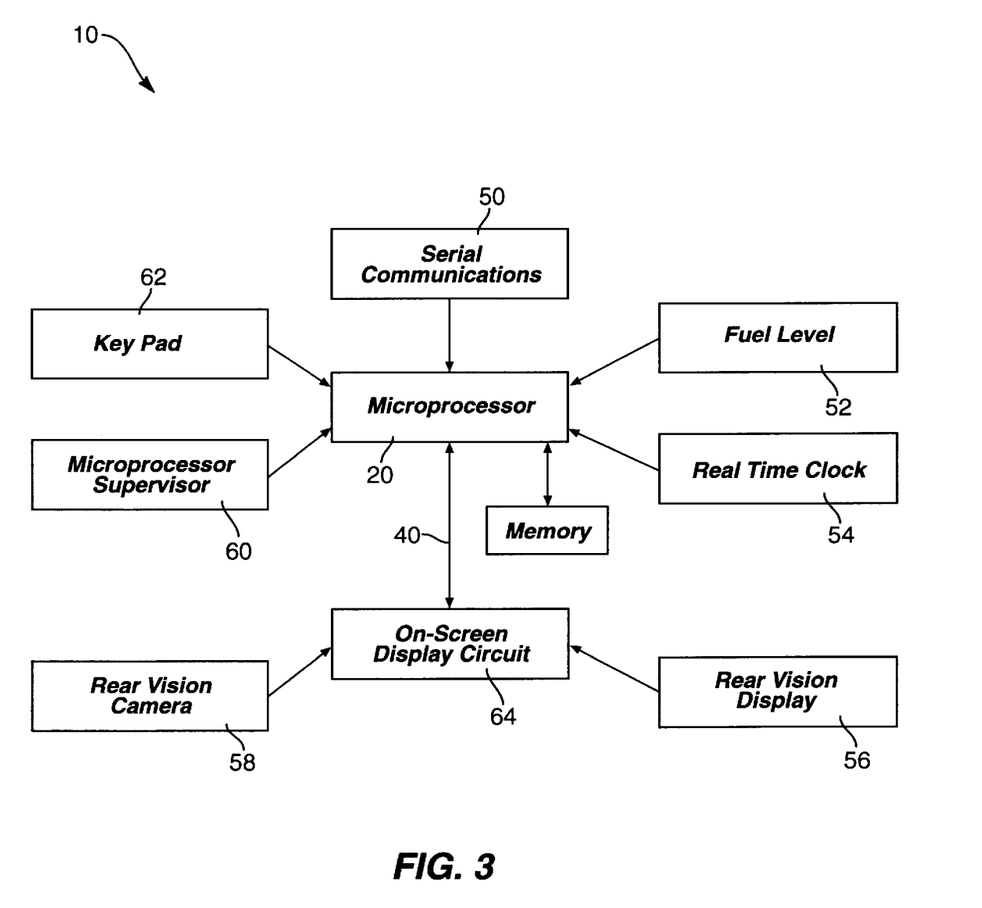
FIG. 3 is a schematic diagram depicting how information is passed from sources to and output from the microprocessor and the on-screen display circuit of an embodiment of the invention.
Figure 4:
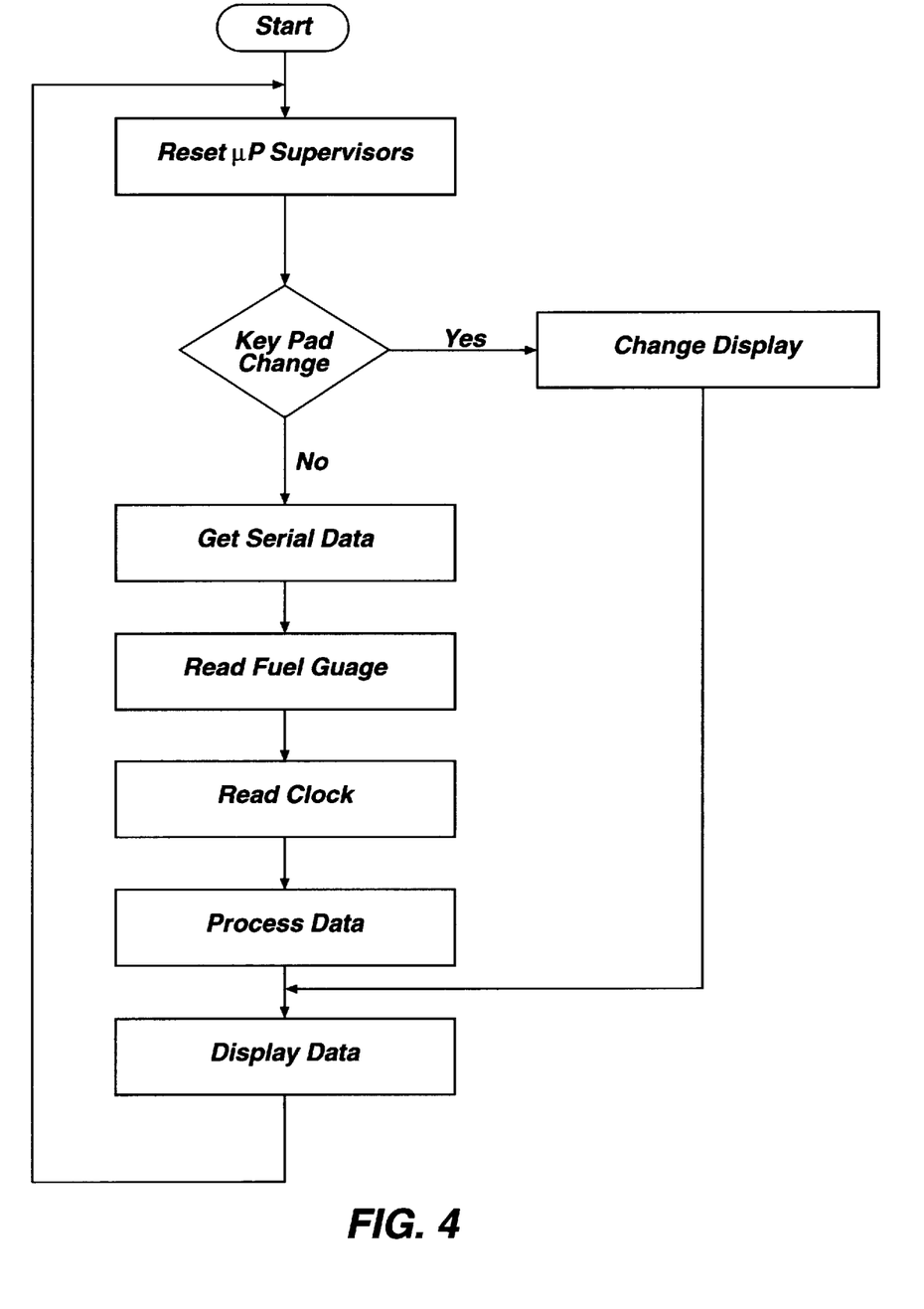
FIG. 4 is a state time diagram for the microprocessor in an embodiment of the invention.
Figure 5A:
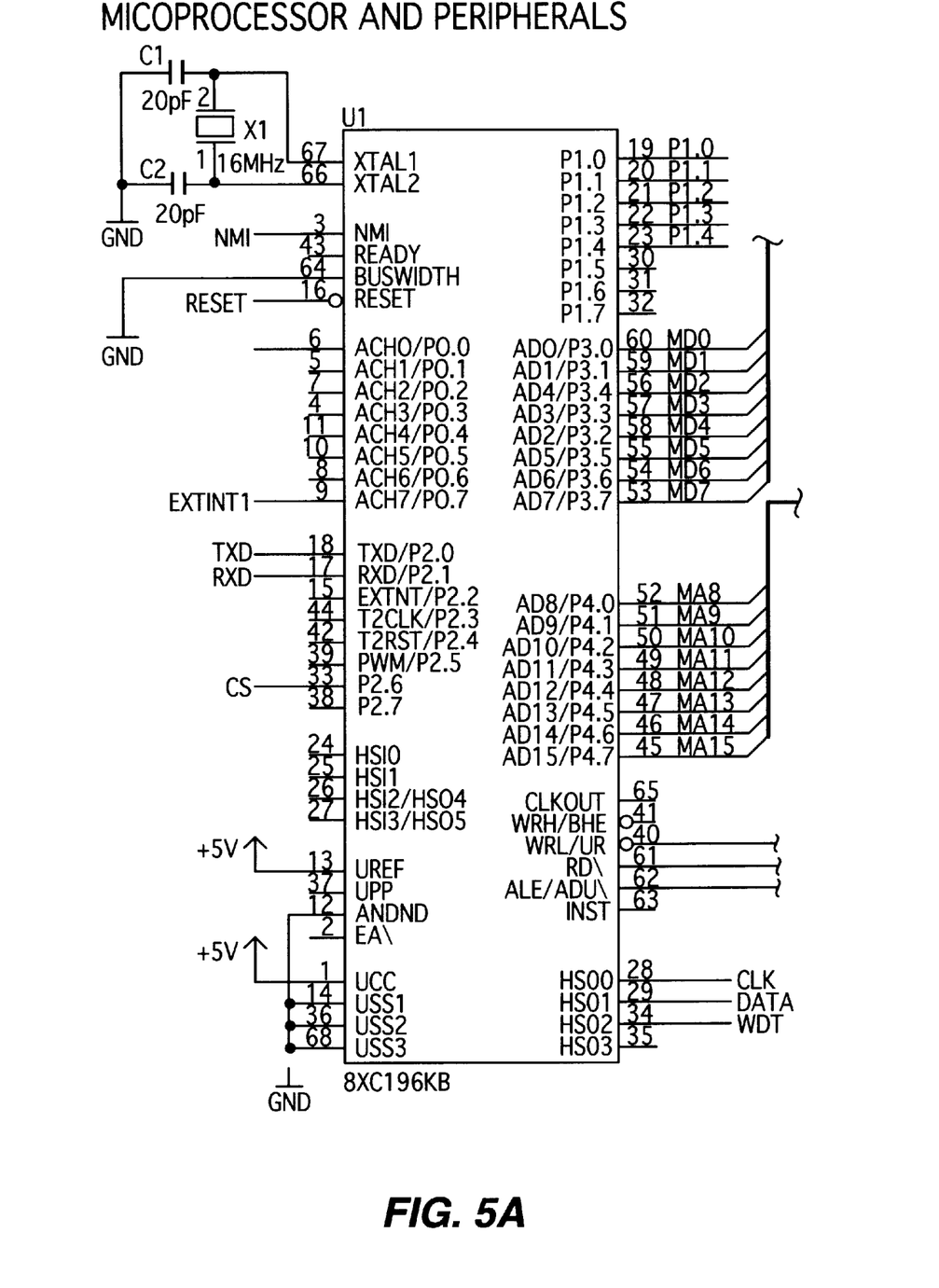
FIG. 5 is a schematic diagram of the microcontroller and peripherals for an embodiment of the invention.
Figure 5B:
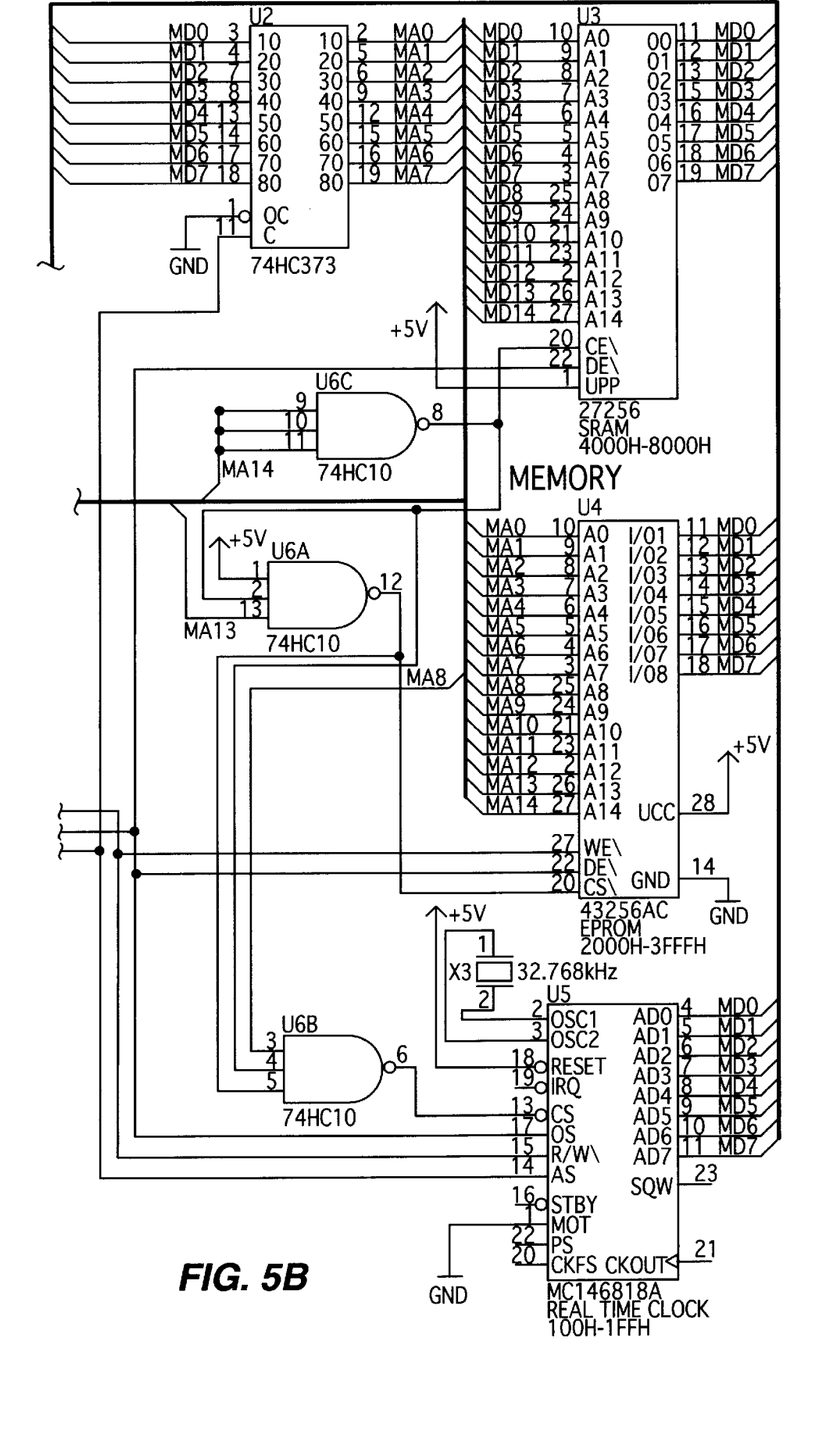
Figure 6:
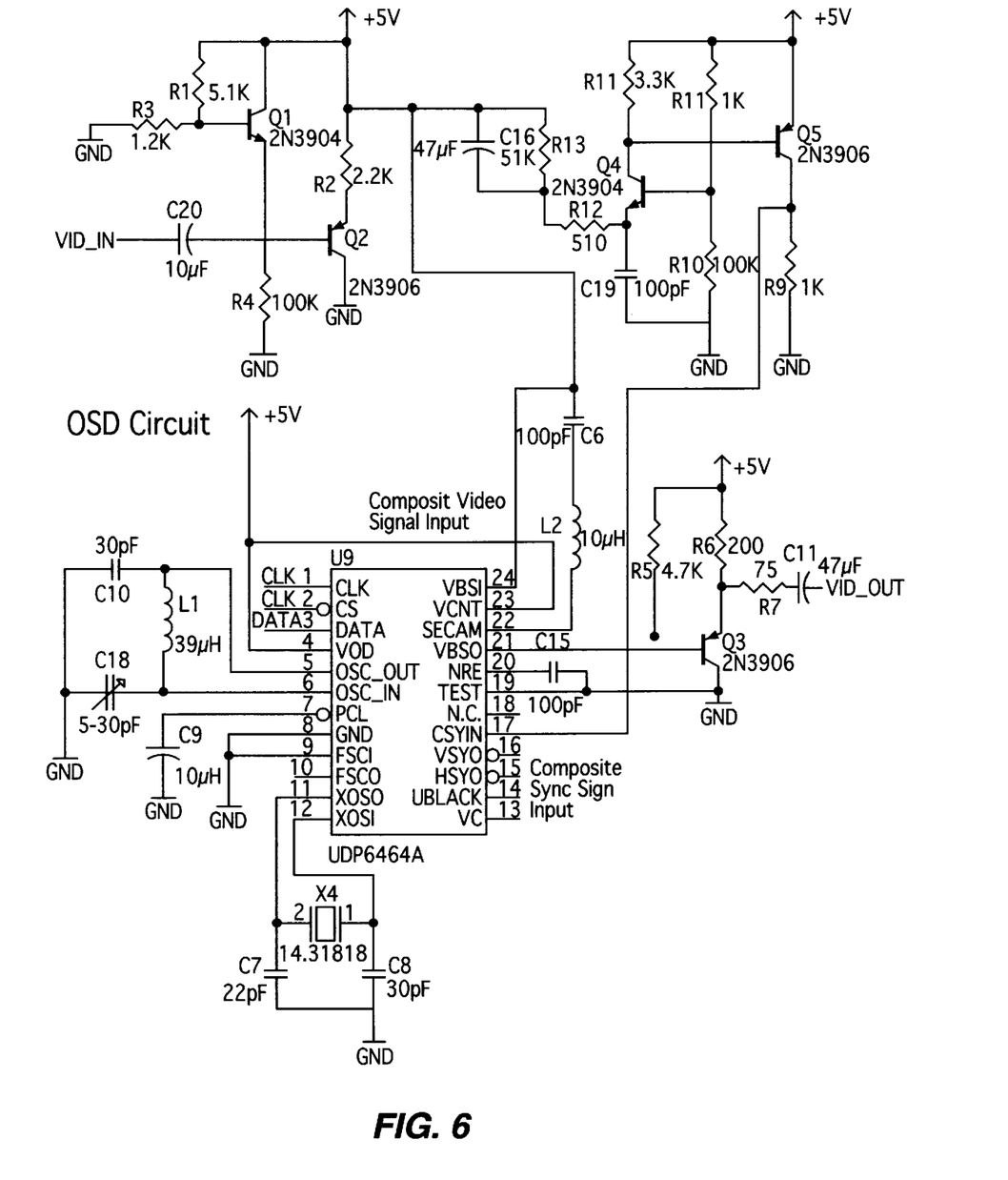
FIG. 6 is a schematic diagram of the on-screen display (OSD) circuit portion of an embodiment of the invention.
Figure 7:
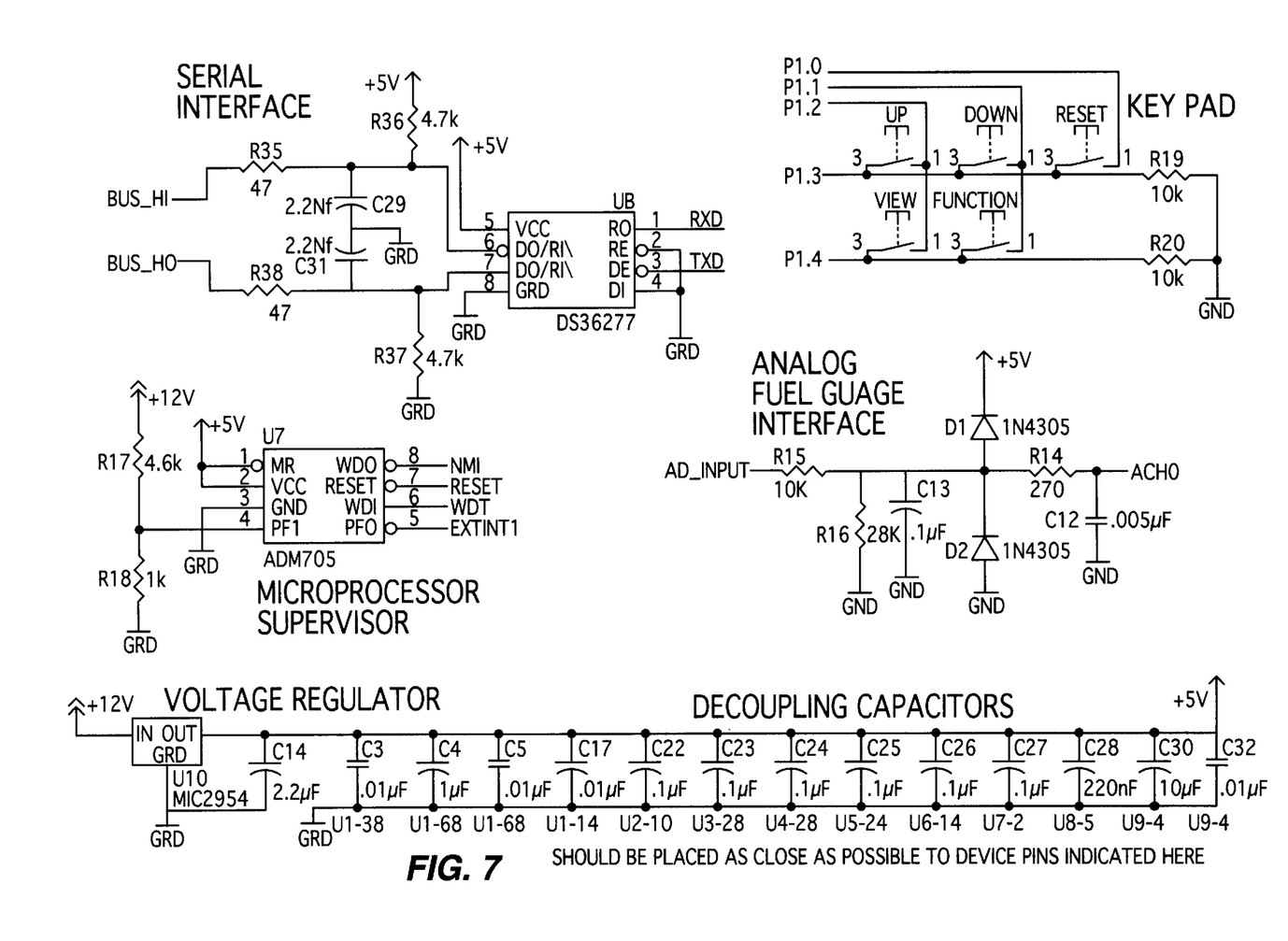
FIG. 7 is a composite schematic diagram of the serial interface, key pad, microprocessor supervisor, analog fuel gauge interface, voltage regulator and decoupling capacitors portions of an embodiment of the invention.

Central to the information flow-path of the invention is the microprocessor 20, to which all information is fed, as depicted in the schematic flow-path of FIG. 3. Information is transmitted from the various input sources, serial communications 50, fuel level 52, real time clock 54, rear vision camera 58, microprocessor supervisor 60, key pad 62, and on-screen display (OSD) circuit 64 and collected by the microprocessor 20. When the information is processed by the microprocessor 20, the data are transmitted to the OSD circuit 64. Information such as the status of the OSD processor from the OSD circuit 64 may also be fed to the microprocessor 20, as shown by the two-directional arrow 40. Also fed to the OSD circuit 64 are the video photography signals from rear-vision camera 58, whenever it is in operation, or other cameras outside the vehicle or inside the vehicle. Rear-vision camera 58 is typically already in position, preferably for the purpose of viewing objects not in front of the vehicle's driver, and electronically connected to rear-vision display monitor 56 so that the driver can view all that is photographed by said camera 58. Thus, simultaneously, the photo image sequences from the camera 58 as well as data from the other data sources are all transmitted to and displayed on the same rear-vision display monitor, or screen, 56.

The data made available to the driver via microprocessor 20, OSD circuit 64, rear-vision camera 58, and rear-vision display 56 are fed to the microprocessor 20 as follows:

a. The real time clock 54 accurately keeps track of time and generates the needed input for determining such information as average speed and time to destination, and time elapse projected before all fuel is consumed.

b. The in-tank fuel level sender unit 52 transmits needed information so the microprocessor 20 may generate information on miles per gallon or kilometers per liter of fuel, average miles per gallon or kilometers per liter, and fuel consumption.

c. The serial communications data source, preferably adhering to the Society of Automotive Engineers (SAE) J1708 standard for serial data communications between microcomputer systems, 50 feeds to the microprocessor 20. Data from the vehicle systems, including engine, transmission and electronic control module is preferably received by the microprocessor 20 as information encoded as per the SAE J1587 standard for electronic data interchange between microcomputer systems. The data mainly consists of vehicle "vital signs" such as water temperature, vehicle speed, oil pressure, outside temperature, fuel consumption or other data as may be desired, via instrumentation attached to the vehicle engine or chassis, inside the engine compartment or outside the vehicle.

d. Variable trip data is transmitted to the microprocessor 20 by the remote keypad 62, which is operated by the driver or an assistant. Such variable data would include, but not necessarily be confined to, miles to destination, scheduled distance to travel in a given time frame, price per gallon or liter of fuel, and time of day.

e. The status and functionality of the microprocessor 20 is monitored by the microprocessor supervisor 60 which must receive acknowledgment from the microprocessor 20 periodically within a fixed interval. Without an acknowledgment from the microprocessor 20, the microprocessor supervisor 60 will reset the microprocessor 20.

With the proper input from the various data sources, the microprocessor 20, under the supervision of the microprocessor supervisor 60, calculates information derived from the input data. For example, miles per gallon or kilometers per liter, average miles per gallon or kilometers per liter, remaining fuel, estimated time of arrival, scheduled maintenance, cost of fuel consumed, etc., can be determined from the inputs of time, fuel price, distance traveled, amount of fuel remaining in fuel tank, amount of fuel used, etc.

Additionally, the remote keypad may be used to allow the driver or an assistant to turn off and on or adjust the type and amount of data shown on the display 56. For example, the system may be programmed so that a few simple keystrokes control which data are displayed, such as:

a. vehicle "vital signs"—oil pressure, water temperature, etc., b. trip progress data—miles to destination, elapsed time, etc., and c. fuel consumption—volume or cost of fuel consumed.

Optionally, the system may be programmed so that various data packages may be sequentially, repeatedly or persistently displayed with a view time of several seconds per package, for safe viewing without having to touch the remote keypad.

The microprocessor supervisor 60 monitors the status and functionality of the microprocessor 20. The interaction between the two is such that if the microprocessor supervisor 60 does not receive a periodic acknowledgment from the microprocessor within a fixed interval, the microprocessor supervisor 60 will understand that there is a problem with the microprocessor 20 and reset it. This is a necessity due in part to the susceptibility of the microprocessor 20 to external influences such as static, electromagnetic or communications interference.

As part of the invented read-out system, a conventional rear display camera and video monitor may be used, including conventional processing of the camera signals. Optionally, a second or differently placed camera may also be used. For example, a video camera mounted inside the vehicle to monitor an ill or elderly person or a resting child may be used.

The vehicle status and trip progress data may be displayed by overlay of alphanumeric data over the camera's picture, in either opaque or translucent mode. The video display circuit 64 consists mainly of an on-screen display processor and support circuitry. The on-screen display processor generates a graphical representation of the alphanumeric data whose video signal output is compatible with the existing rear vision display monitor. In addition, the on-screen display processor combines the video from the rear-vision camera 58 with the graphical representation of the alphanumeric data, creating an overlay, for example.

Electronic communication between the on-screen display processor and the microprocessor 60 is specified as three wire, half duplex serial communications at a rate of no more than one million bits per second. Communications between the microprocessor 60 and the vehicle systems including engine, transmission and electronic control module is preferably by means of the SAE J1708 serial communications protocol which is a two-wire, dominate-mode, 9600 bits per second multi-drop serial protocol. The fuel level is provided by the fuel level sender unit 52 as an analog signal with a nominal range from zero volts to 13.6 volts. The microprocessor 20 interfaces with the fuel level sender unit 52 by means of an analog to digital converter.

The process that the microprocessor 20 must control is one where once each computation cycle data is read from the serial communications bus 50. This data includes, but is not limited to, current fuel consumption rate, engine and transmission temperature, current speed, odometer reading, etc. Data is also read from the fuel level sender unit 52 and the real-time clock 54. The status of the remote keypad is also checked to determine whether the driver is adjusting variable trip data. The microprocessor then calculates information to be displayed for the driver from the input data such as: miles per gallon or kilometers per liter, average miles per gallon or kilometers per liter, remaining fuel, estimated time of arrival, scheduled maintenance, cost of fuel consumed, etc. The data is then formatted into a table and the alphanumeric characters are transmitted to the on-screen display processor. Meanwhile, the microprocessor 20 must acknowledge its continued operation by signaling the microprocessor supervisor 60 at a regular rate.

Optionally, other data besides vehicle diagnostics and trip progress data may be made available and viewed via the invented read out system. For example, emergency phone numbers for remote phone use may be stored, or weather or road conditions transmitted from information broadcasters may be shown. Maps or travel instructions may be stored in the system, or may be received from various broadcasters and updated on the read out system, for display at request of the vehicle occupants.

Although this invention has been described above with reference to particular means, materials and embodiments, it is to be understood that the invention is not limited to these disclosed particulars, but extends instead to all equivalents within the scope of the following claims.

What is claimed is:

1. A trip vehicle information system comprising a video camera attached to a vehicle for viewing an environment of the vehicle;

a video integrated circuit electronically connected to said camera for processing camera signals;

a video monitor electronically connected to said video integrated circuit for displaying views of the environment recorded by the video camera;

a microprocessor electronically connected to said video integrated circuit;

instrumentation means connected to the vehicle for sensing and displaying vehicle conditions and for transmitting data describing said conditions to said microprocessor;

and the microprocessor programmed to integrate and adapt instrument signals from the instrumentation means to be output to the video integrated circuit for display by the video monitor in an image reflecting the output of the video camera and the instrument signals;

and a microprocessor supervisor for receiving periodic acknowledgments from said microprocessor, said supervisor causing resetting of the microprocessor if it does not receive an acknowledgment within a fixed interval.

2. An information system as in claim 1, further comprising a microprocessor supervisor electronically connected to said microprocessor.

3. An information system as in claim 1, wherein said instrumentation means comprises a fuel level indicator.

4. An information system as in claim 1, wherein said instrumentation means comprises an oil pressure sensor.

5. An information system as in claim 1, wherein said instrumentation means comprises a water temperature sensor.

6. A method of displaying vehicle diagnostic information comprising displaying vehicle diagnostic information on a rear-view camera video monitor.

7. A method as in claim 6 wherein said vehicle diagnostic is overlaid over rear-view video camera images on said monitor.

8. A method as in claim 7, further comprising displaying microprocessor-calculated information comprising vehicle fuel consumption rates and miles per gallon.

* * * * *